United States Patent [19]
Kim

[11] Patent Number: 5,729,647
[45] Date of Patent: Mar. 17, 1998

[54] ERROR-CORRECTION-CODE CODING AND DECODING PROCEDURES FOR THE TRANSMISSION AND RECEPTION OF DIGITAL VIDEO DATA

[75] Inventor: Tae-eung Kim, Kyungki-do, Rep. of Korea

[73] Assignee: Samsung Electronics Co., Ltd., Suwon, Rep. of Korea

[21] Appl. No.: 689,633

[22] Filed: Aug. 16, 1996

Related U.S. Application Data

[63] Continuation of Ser. No. 401,498, Mar. 10, 1995, Pat. No. 5,627,935.

[30] Foreign Application Priority Data

Nov. 11, 1994 [KR] Rep. of Korea ............ 94-29595

[51] Int. Cl.$^6$ .............................. H04N 5/91; H04N 5/917
[52] U.S. Cl. .............................. 386/46; 386/109
[58] Field of Search .................. 386/66, 109, 27, 386/33, 34; 360/32, 40; 348/384; 371/37.4, 40.6, 49.1, 51.1; H04N 5/91, 5/917

[56] References Cited

U.S. PATENT DOCUMENTS

| | | | |
|---|---|---|---|
| 5,241,563 | 8/1993 | Paik et al. | 375/1 |
| 5,289,322 | 2/1994 | Higashida et al. | 360/32 |
| 5,504,759 | 4/1996 | Inoue et al. | 371/37.4 |
| 5,546,409 | 8/1996 | Karasawa | 371/37.4 |

FOREIGN PATENT DOCUMENTS

0 606 857 A' 1/1993 European Pat. Off. .
0 624 978 A 11/1994 European Pat. Off. .

Primary Examiner—Robert Chevalier
Attorney, Agent, or Firm—Allen LeRoy Limberg

[57] ABSTRACT

The error-correction coding function of an SD-VCR for recording and reproducing an ATV signal is modified to exclude trick-play data from outer error-correction coding in two-dimensional Reed-Solomon coding of normal play data, to improve error-correcting capability for the normal-play data. The same error-correction coding used as inner error-correction coding in the two-dimensional Reed-Solomon coding of normal play data is performed on the trick-play data as well as on the outer error-correction coded normal-play data. The resulting inner codes are preferably diagonal-scan interleaved before recording, at least for the normal-play data. During reproduction, after de-interleaving when interleaving was performed during recording, the inner error-correction coded data are decoded and separated into trick-play data and outer error-correction coded normal-play data. Outer error-correction coded normal-play data are decoded during normal play.

4 Claims, 11 Drawing Sheets

$m1+m2+\cdots+mm=M(105), n1+n2+\cdots+nK=n(30)$

ERROR-CORRECTION-CODE CODING AND DECODING PROCEDURES FOR THE TRANSMISSION AND RECEPTION OF DIGITAL VIDEO DATA

This is a continuation of application Ser. No. 08/401,498, filed Mar. 10, 1995, now patented (U.S. Pat. No. 5,627,935).

The invention relates to recording and reproducing digital video data and, more particularly, to recording and reproducing an advanced television signal (ATV signal).

BACKGROUND OF THE INVENTION

A digital videocassette player (DVCR) has been developed for the general-purpose recording of ATV signals as digital video data and reproducing the ATV signals from the recorded digital video data. Particularly, in the case of a standard-definition videocassette recorder (SD-VCR) for recording and reproducing the ATV signal, research has proceeded into improved recording formats for special reproduction, which provide high picture quality and satisfy price requirements. The ATV signal fed to the SD-VCR includes a transport packet having an MPEG-2 structure recommended by the Moving Picture Experts Group (MPEG).

The conventional SD-VCR signal consists of intra-frame coded data having a two-dimensional error correction code (ECC) structure. The code conventionally used for the error-correction encoding is a two-dimensional modified Reed-Solomon code (R-S code). For the purpose of understanding the two-dimensional error-correction encoding, per convention the data bytes are considered as being arrayed by row and by column, with each row of bytes extending in a row direction, with each column of bytes extending in a column direction. The SD-VCR error correction code for digital video as it extends in a row direction, called inner code, is of a type referred to as (85, 8) in which eight bytes of the eighty-five bytes per row of digital video are used for conveying row parity information. The SD-VCR error correction code for digital video as it extends in a column direction, called outer code, is of a type referred to as (149, 11) in which eleven bytes of the one hundred forty-nine bytes per column of digital video are used for conveying column parity information.

During the recording process, after outer error-correction encoding is performed by appending eleven bytes of outer parity to a 138-byte outer code in the column direction, the inner error-correction encoding is performed by appending eight bytes of inner parity to a 77-byte inner code in the row direction. Recording is done row by row, one data sync block after another. The data are recorded according to the SD-VCR standard, using 24/25 modulation in which an extra bit is added to the beginning of each three-byte data word and the result is subjected to interleaved NRZI modulation. The three bytes of each data word are randomized prior to interleaved NRZI modulation according to standardized patterns, proceeding from the bytes submitted for recording. The particular data modulation scheme used during recording is immaterial to the invention disclosed herein. During the reproducing process, after recovering the bytes submitted for recording, the inner error-correction decoding is first performed in the row direction; and, after the error is corrected for a maximum of four bytes among 85 bytes in each of the 149 rows, any uncorrected sync block has an error flag appended thereto. Then, the outer error-correction decoding is performed in the column direction for correcting uncorrected sync blocks up to a maximum of eleven bytes among 149 bytes, by using the error flag in the process for identifying those sync blocks that are to be subject to correction.

Each frame of the SD-VCR signal is recorded in specified first portions of a number of consecutive recording tracks (five tracks per field of each two-field frame, in the case of 455 lines per one-thirtieth second frame time conventional color video) with the first portion of each recording track recording a respective macroblock of data having a fixed number of bits. As referred to the original video information supplied for recording, each macroblock contains a 4-block section of the luminance component and two spatially corresponding sections of chrominance components. Each section of respective chrominance component includes 1, 2 or 4 blocks depending on the relative spatial resolution of luminance and chrominance information in different types of macroblock respectively referred to as 4:2:0, 4:2:2 and 4:4:4 type. Each block of data is a square array of picture element samples having 8 rows and 8 columns. The term "block" is also used to refer to the code generated by coding the discrete cosine transform (DCT) of the square array of picture element samples; and the term "macroblock" is also used to refer to the code generated by coding the discrete cosine transforms (DCTs) of the blocks within the macroblock of original video information supplied for recording.

On the other hand, the ATV signal comprises mostly inter-frame coded data, interspersed between occasional intra-frame coded data, in a structure specified by the MPEG-2 standard. This structure includes groups of intra-frame coded data respectively descriptive of selected I video frames, which video frames are independently encoded without relying upon information from another video frame; P data frames coding differences of respective video frames from video frames predicted from the preceding intra-frame or predicted-frame data using motion compensation between adjacent video frames; and B data frames coding differences of respective video frames from video frames that are bi-directionally predicted from the preceding intra- or predicted-frame data and the following intra- or predicted-frame data, using motion compensation between adjacent video frames. One group of pictures (GOP) generally consists of fifteen frames, to facilitate processing the NTSC television signal having thirty frames per second. Additionally, the transmission order and the display order are formatted according to the MPEG-2 model, using I-P-B-B-P-B-B-P-B-B-P-B-B-B-B for the transmission order and using I-B-B-P-B-B-P-B-B-P-B-B-P-B-B for the display order. However, in practice, a B-B-I-P-B-B-P-B-B-P-B-B-P-B-B transmission order is customarily used together with the I-B-B-P-B-B-P-B-B-P-B-B-P-B-B display order. In the SD-VCR, the supplied ATV signal is encoded in this practical transmission order, and the signal is reproduced in the practical display order by the television monitor used with the SD-VCR.

The intra-frame coded data descriptive of an I video frame are independently coded without reference to any other video frame. However, during the inter-frame encoding of P and B video frames within each group of pictures (GOP) unit (fifteen frames maximum) following an I video frame, only the differences between the frame being encoded and another frame are encoded, using dependently coded inter-frame coding. So, if an error is generated in decoding one frame of the ATV signal, the error propagates to other frames of the corresponding GOP unit dependently coded therefrom. Since the ATV signal is largely inter-frame coding data, if an error is generated in the normal-play data of an ATV signal, the picture quality displayed by the SD-VCR is almost always unacceptably flawed.

A previous solution to this problem allocates a specified portion of the normal-play data region, which portion is referred to as the ECC3 region, for storing additional information for correcting the error of the normal-play data. This is in addition to an ECC1 region for storing outer parity information appended to the outer code and an ECC2 region for storing the inner parity information appended to the inner code. The result, however, is a lowered recording efficiency for the normal-play data per se. Accordingly, the inventor sought a method of recording and reproducing digital video data applicable for use in an SD-VCR for recording and reproducing an ATV signal, which method does not require a special ECC3 region, but which improves the error-correcting efficiency for the normal-play data during normal reproduction. The inventor made a number of observations when considering how to find such a method.

The trick-play data will normally not be used for still-frame purposes in an SD-VCR that records ATV since normal-play data descriptive of a complete detailed I intra-frame are stored in framestore memory, as part of the procedure of decoding the ATV signal in the ATV receiver, so still-frame operation is available from the ATV receiver. Slow-motion effects can also be achieved using normal-play data. The need for incorporating trick-play data into recorded ATV is primarily for implementing fast search of recorded data using viewable fast-forward and fast-reverse modes of play. It is desirable to derive trick-play data proceeding solely from intra-frame coded frames, since there is no prescribed sequential order of frames associated with intra-frame coding and decoding that has to be taken into account when implementing a viewable fast-reverse mode of play.

Coding and decoding in inter-frame coding is done presuming the frames to occur in a prescribed order in time, which complicates the implementation of a viewable fast-reverse mode of play using inter-frame coded frames. In the viewable fast-reverse mode of play the previous intra-frame coded frames are unavailable as a basis for updating by substantially-real-time dependent decoding of inter-frame coded frames, as coded for the viewable fast-forward mode of play. Sufficient storage for an entire 16-frame GOP is required to provide for the time-reversal of the inter-frame decoding procedure, which substantially increases the cost of the recorder/reproducer.

If the trick-play data are derived solely from intra-frame coded frames, and if the normal-play data are coded without reliance on trick-play data, the problem of providing substantially errorless error correction of the normal-play data is completely separate from the problem of correcting errors in the trick-play data, the inventor discerned. He also discerned that the problem of correcting errors in the trick-play data is a substantially less stringent one than the problem of correcting errors in the normal-play data. This is in part because viewers of images reproduced from recorded SD-VCR signals are less critical of trick-play images produced in viewable fast-forward and fast-reverse modes of play, referred to as fast-search modes. The problem of correcting errors in the trick-play data is also of reduced concern when the trick-play images are only intra-frame coded; this is because there is no frame-to-frame propagation of errors, as would be the case with inter-frame coding.

These observations by the inventor inspired the inventive insight that it would be advantageous to exclude the trick-play data when determining the outer parity to be appended to the outer code. An expurgated Reed-Solomon code with fewer bytes per column in the outer code could be used when excluding the trick-play data in determining the outer parity. However, since the number of bytes per column in the outer code of the R-S code for SD-VCR has already become standardized to some degree, the inventor finds it preferable for compatibility reasons to replace the rows of trick data with rows containing prescribed bytes for the purpose of determining the outer code parity bytes. When decoding the R-S code during video reproduction, the rows containing the prescribed bytes replace the rows of trick data before making the error-correction calculations and are treated as constants not subject to correction, rather than variables subject to correction in the error-correction calculations. Excluding the N rows of trick-play data when determining the outer parity to be appended to the outer code allows the eleven bytes of outer parity to correct eleven errors in a column of 149-N bytes of normal-play data, rather than eleven errors in a column of 149 bytes, 149-N of which were normal-play data and N of which were trick-play data. Since N is typically thirty or so, improved error-correction capability is afforded to the normal-play data by excluding the trick-play data from the calculation of outer parity. Error correction for the trick-play data is provided just by inner error-correction encoding, or it is provided by its own separate outer error-correction encoding followed by inner error-correction encoding.

Correction of errors in normal-play data is further improved by diagonally scanning the two-dimensional R-S code across its rows to obtain bytes for recording. During playback diagonal scanning to regenerate horizontal rows of the two-dimensional R-S code for inner error-correction decoding converts a burst error to isolated single-byte-per-row errors that are more likely to be within the byte-correction-per-row capability of the inner error-correction decoding. An error burst that is sustained for a protracted period equal to the duration of a few rows, the number of which rows is less than the number of bytes per row that can be corrected by the inner error-correction code, is converted to a plurality of shorter error bursts in the de-interleaved rows. Many of these shorter error bursts can be corrected by the inner error-correction code, conserving the longer-burst burst error correction capability of the outer error-correction code applied to normal-play data.

SUMMARY OF THE INVENTION

The error-correction coding function of an SD-VCR for recording and reproducing an ATV signal is modified to exclude trick-play data from outer error-correction coding in two-dimensional Reed-Solomon coding of normal play data, in accordance with one aspect of the invention, to improve the error-correcting capability of the outer error-correction coding for the normal-play data. The same error-correction coding used as inner error-correction coding in the two-dimensional Reed-Solomon coding of normal play data is performed on the trick-play data as well as on the outer error-correction coded normal-play data.

The error-correction coding function of an SD-VCR for recording and reproducing an ATV signal is modified to introduce diagonal scan interleaving of the two-dimensional Reed-Solomon coding of normal play data, as recorded on video tape, in accordance with another aspect of the invention. After the de-interleaving done during reproduction from the video tape, the inner error-correction coding for the normal-play data is thus provided with the capability to correct burst errors, without the capability of the outer error-correction coding to correct burst errors being reduced.

DESCRIPTION OF THE INVENTION

Figure 1:
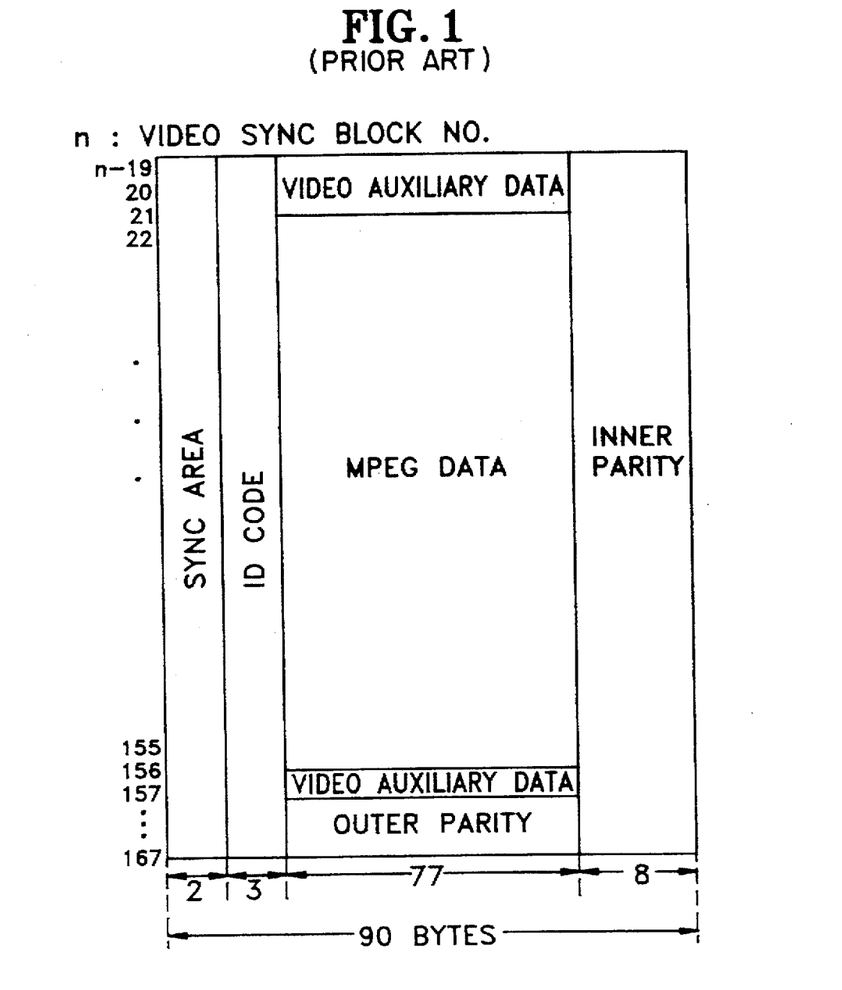
FIG. 1 is a diagram for illustrating the format of the video portion of the signal supplied for recording on a digital video tape having an SD-VCR recording format.

FIG. 1 depicts the structure of data sync blocks of a video portion of the signal supplied for recording on a digital video tape having an SD-VCR recording format (hereinafter referred to as the ECC block). Each row of the ECC block is a respective data sync block which in previous practice are recorded row by row, scanning from left to right. Each video portion of a helically recorded track on the digital video tape includes 149 data sync blocks descriptive of video and accompanying error correction codes, which 149 data sync blocks are preceded by 18 data sync blocks (not shown) containing a video preamble and are followed by data sync blocks (not shown) containing a video postamble.

Figure 2:
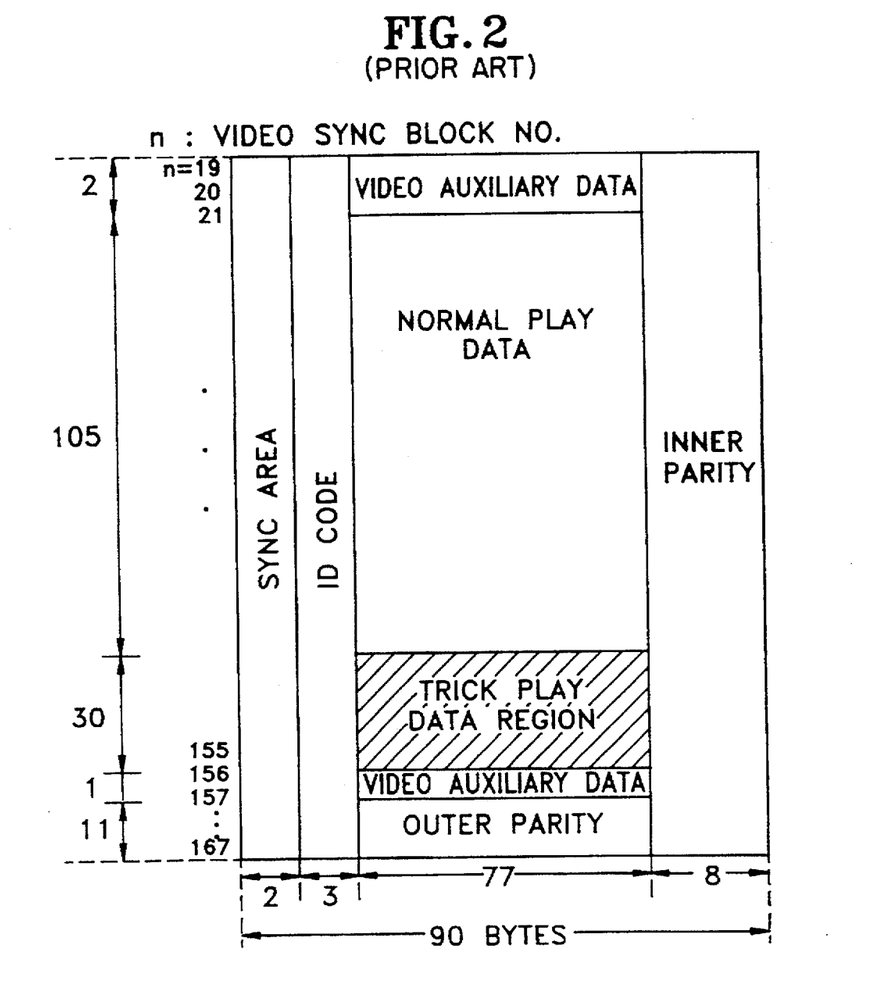
FIG. 2 is a diagram for illustrating an example of the arrangement of trick-play data within the video portion of the signal supplied for recording on a digital video tape having an SD-VCR recording format.
Figure 3:
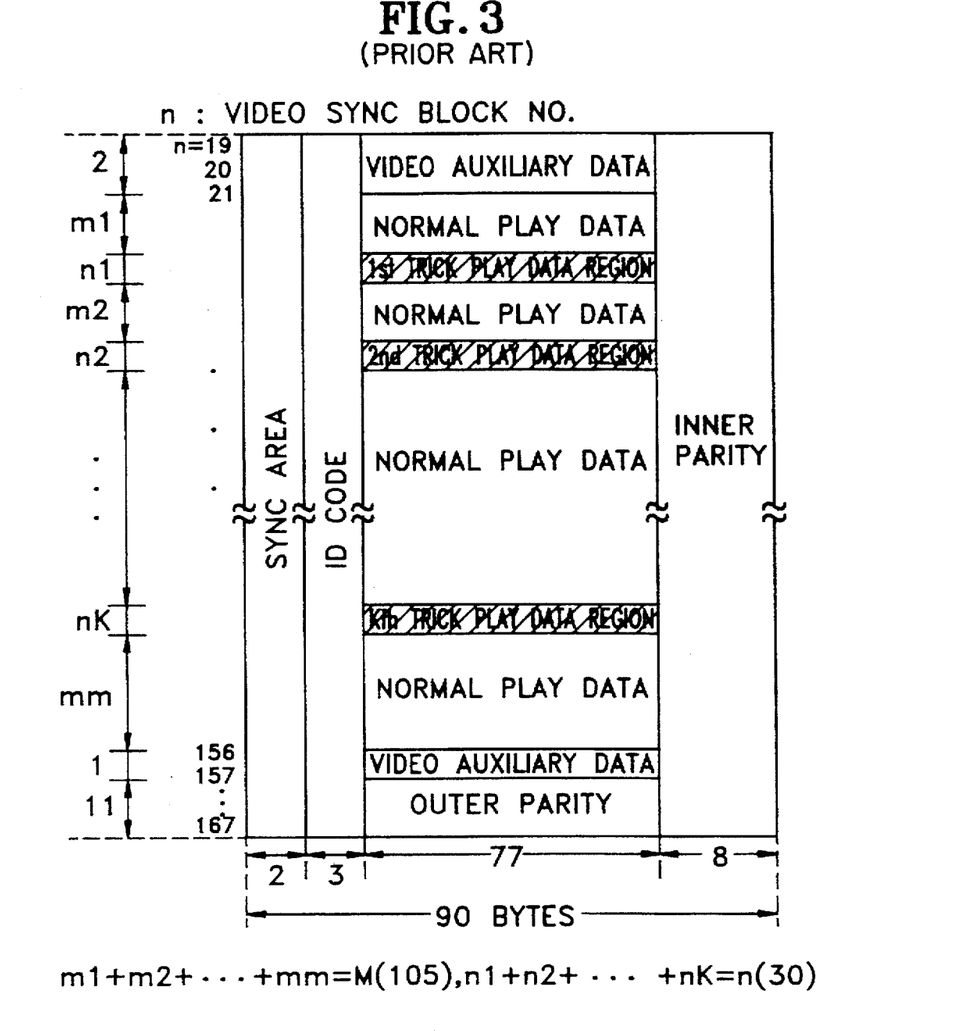
FIG. 3 is a diagram for illustrating another example of the arrangement of trick-play data within the video portion of the signal supplied for recording on a digital video tape having an SD-VCR recording format.

To develop a DVCR having a recording format for special reproduction ("trick-play" operations) which provides high quality picture and satisfies price requirements, the method of providing the video tape with the ECC block structure shown in FIGS. 2 and 3 is introduced. Aspects of the invention disclosed within this specification concern methods for increasing the error-correcting efficiency for the normal-play data during the normal reproduction of data recorded on a tape having the ECC block structure shown in FIG. 2 or FIG. 3.

The ECC block structure shown in FIG. 2 is applied to the tape having a recording format in which the trick-play data are repeatedly recorded on as many non-overlapping pairs of adjacent tracks as correspond to the maximum multiple speed. Also, the trick-play data region is arranged on a predetermined position of each track. The ECC block structure shown in FIG. 2 is composed of $19^{th}$ and $20^{th}$ sync blocks as a first video auxiliary, data region, $21^{st}$ to $126^{th}$ sync blocks as the normal-play region, $127^{th}$ to $156^{th}$ sync blocks as the trick-play data region, a $156^{th}$ sync block as a second video auxiliary data region, and $157^{th}$ to $167^{th}$ sync blocks as the outer parity region. Also, each sync block is composed of a 2-byte sync-code, a 3-byte identification (ID) code, 77 bytes of data, and an 8-byte inner parity suffix for the inner error-correction code. With the FIG. 2 recording method, since the tape scanning is performed within the repeat-recording region without precise servo control, implementing trick play does not increase the cost of producing the recorder/reproducer very, much. However, a great deal of the recording region is consumed, owing to the repeated recording. Also, the frame rate is excessively slow at the lower multiple speeds, resulting in flicker and obviously jerky motion which cause eye fatigue and impair picture quality.

The ECC block structure shown in FIG. 3 is applied to a tape having a recording format in which trick-play data are recorded on scanning regions corresponding to each of the multiple speeds. Also, k trick-play data regions are separately arranged on each track. The ECC block structure shown in FIG. 3 is composed of $19^{th}$ to $20^{th}$ sync blocks as a first video auxiliary data region, a total of N(30) sync blocks within $1^{st}$ to $k^{th}$ trick-play data regions, a total of M(105) sync blocks within $1^{st}$ to $m^{th}$ normal-play data regions, a $156^{th}$ sync block as a second video auxiliary, data region, and $157^{th}$ to $167^{th}$ sync blocks as the outer parity region. The m regions of normal-play data are shown as being one more than the k regions of trickplay data. With the FIG. 3 method of incorporating trick-play data within the ECC block, the images reproduced on the screen of a television receiver during fastsearch reproduction are free from excessive flicker and motion generally appears to be fluid. However, since the corresponding regions of the arrangement for each search speed have to be selectively scanned, the servo control has to be precise in its operation during trick play, which increases costs.

Figure 4:
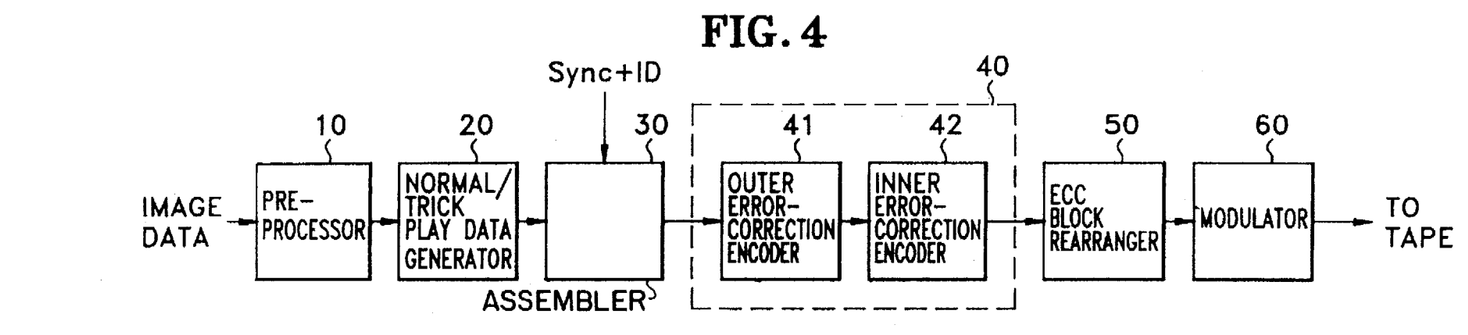
FIG. 4 is a block diagram of a digital video data recording apparatus for recording digital video data in accordance with a method that is an aspect of the invention.

FIG. 4 is a block diagram of a digital video data recording apparatus for performing methods that improve the capabilities for the correcting error in the normal-play data on a tape having the ECC block structure shown in FIG. 2 or FIG. 3. In FIG. 4, the video signal input to a pre-processor 10 is an ATV signal. Here, the ATV signal is an inter-frame encoded signal included within an MPEG-2 transport packet structure. The transport packet structure comprises a system layer of user data, a layer of audio data, and a layer of video data structured in accordance with the MPEG-2 specification. The pre-processor 10 separates the video layer from the MPEG-2 transport packet and supplies the separated video layer to a normal/trickplay data generator 20. The separated video layer, which is of the general nature described in the background of the invention, includes groups of intra-frame coded data respectively descriptive of selected I video frames, which I video frames are independently encoded without relying upon information from another video frame, and groups of inter-frame coded data respectively descriptive of the differences of intervening P and B video frames from predictions based on other video frames.

The intra-frame data in every sixteenth frame are used to generate the trick-play data recorded on each video portion of the digital video tape. The normal/trickplay data generator 20 selects these independently coded intra-frames from the separated video layer and decodes each of them to recover the discrete cosine transform (DCT) blocks descriptive of video. The normal/trickplay data generator 20 then generates trick-play data for recording by the SD-VCR in the trick-play data region. This is done by selecting a few coefficients per DCT block from the decoded intra-frame data (generally, one DC coefficient and one or two AC coefficients per block) and coding them in accordance with MPEG-2 intra-frame (I-frame) coding procedure, preferably using fixed-length codes. A portion of the same codebook as used when coding normal-play I-frame data can be used. Coding the trick-play data in this way permits its decoding during reproduction to be done with the same decoder and inverse codebook used for decoding normal-play I-frame data, but there is likely to be some loss in the coding efficiency for normal-play data if fixed-length coding is used for the simpler DCT blocks. The normal/trickplay data generator 20 also passes all the intra-frame data and inter-frame data coded in accordance with MPEG-2 coding procedure, to provide the normal-play data for recording in the normal-play data region. Since the DCT coefficients for frames coded in the trick-play data are retained in the normal-play data that are intra-frame coded, the correction of errors in the normal-play data does not depend upon the correction of errors in the trick-play data.

An assembler 30 time-division-multiplexes a sync code and an identification code with selected normal-play data and trick-play data supplied from the normal/trickplay data generator 20, to group the normal-play data and trick-play data supplied from the normal/trickplay data generator 20 within appropriate video sync blocks reserved for the two types of data. An error-correction encoding unit 40 error-correction encodes the data supplied from the multiplexer 30. The code used for error-correction encoding the normal-play data is two-dimensional Reed-Solomon code (R-S code), but only the inner one-dimensional Reed-Solomon code of this two-dimensional code is used for error-correction encoding the trick-play data.

An outer error-correction encoder 41 included within the error-correction encoding unit 40 appends the 11-byte outer parity to each 138-byte sync block composed of a (138-N) -byte outer code followed by N bytes of trick-play data. The outer error-correction encoder 41 differs from that previously used in that the N bytes of trick-play data are not used in determining the 11-byte outer parity. Instead, N bytes of prescribed values are substituted for the N bytes of trick-play data. For example, a respective arithmetic zero can be used for each of the N bytes of sync block data that are used instead of one of the N bytes of trick-play data when determining the eleven bytes of outer parity for outer error-correction encoding. More generally, for each column any respective pattern of N arithmetic values can be prescribed for replacing the N bytes of trick-play data in determining the eleven bytes of outer parity for outer error-correction encoding during recording and for subsequently performing outer error correction when decoding during reproducing video signal, resulting in a variety of multiple-dimension patterns of data for the N rows of prescribed bytes used for replacing trick-play data when determining outer parity. If the bytes are 8-bit bites, the respective binary arithmetic value of prescribed nature that replaces each of the N bytes of trick-play data can range from 0000 0000 (zero) to 1111 1111 (two hundred fifty-five) in 8-dimensional bit space.

Using arithmetic zeroes for each of the N bytes of sync block data that are substituted for the N bytes of trick-play data during determination of outer parity is preferred, however. A pattern of all arithmetic zeroes is simply generated, so read-only memory need not be provided for storing the pattern of data. Furthermore, since additions concerning arithmetic zeroes can be omitted in performing calculations, using a pattern of all arithmetic zeroes simplifies the outer error correction calculations, both as performed during encoding and as performed during subsequent decoding to reproduce the recorded video signal.

Figure 5A:
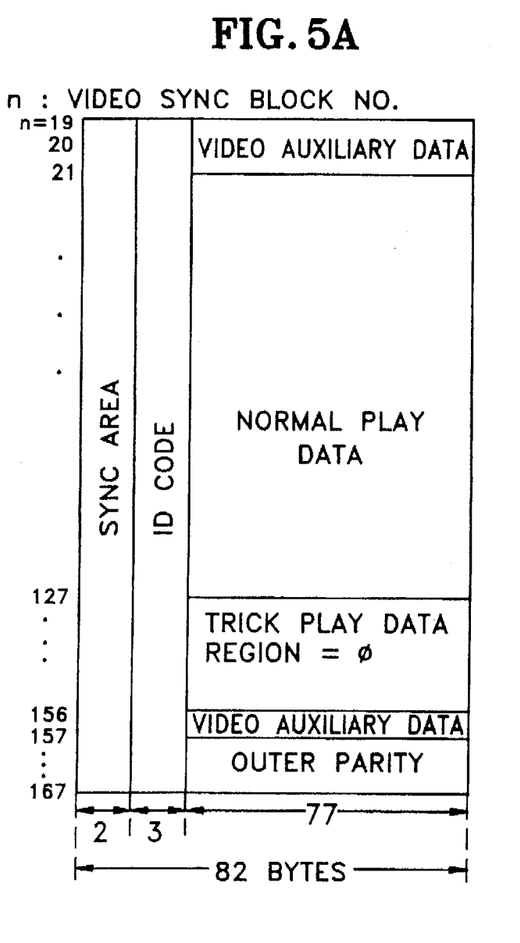
FIGS. 5A and 5B are diagrams for illustrating the outer and inner error-correction encoding operations performed in the error-correction encoding unit of FIG. 4, so as to arrange the data as shown in FIG. 2.
Figure 5B:
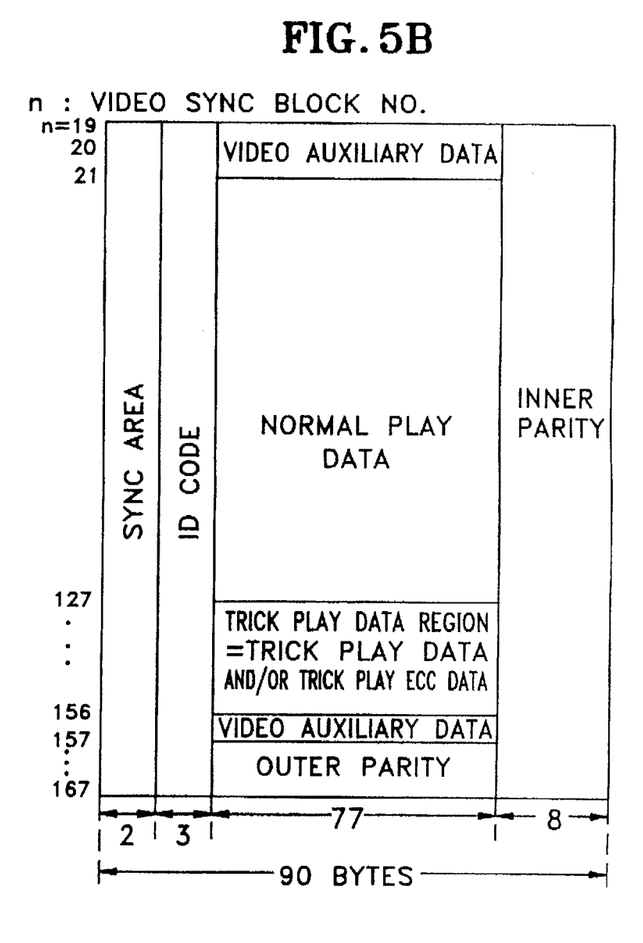

FIG. 5A illustrates this preferred way of performing the outer error correction calculations in a modification of the FIG. 2 coding procedure, in which modification all of the trick-play data are replaced by arithmetic zeroes in input signal supplied to the outer error-correction encoder 41 when calculating the outer parity code bytes. FIG. 5B illustrates how the subsequent inner error-correction calculations are performed with the trick-play data being restored in the data supplied to an inner error-correction encoder 42 included within the error-correction encoding unit 40 of FIG. 4. The inner error-correction encoder 42 calculates the inner parity code bytes for each of the 149 sync blocks and appends the 8-byte inner parity for each sync block to its 77-bytes of data in a way similar to that shown in FIG. 5B. That is, the inner parity is appended to all 149 of the video sync blocks irrespective of whether they contain normal play data, trick play data or outer parity code.

Figure 7A:
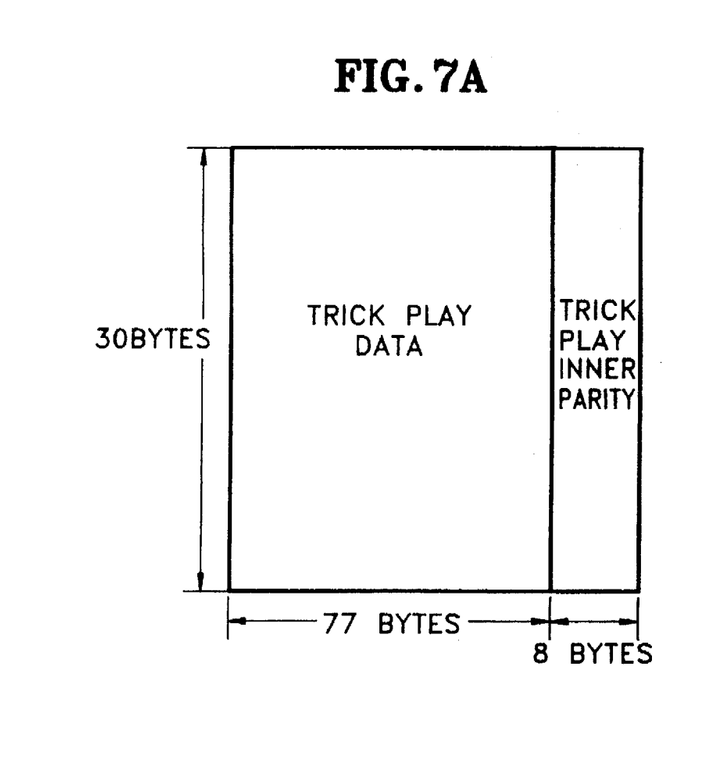
FIGS. 7A and 7B are diagrams for illustrating the trick-play data regions shown in FIGS. 5B and 6B.
Figure 7B:
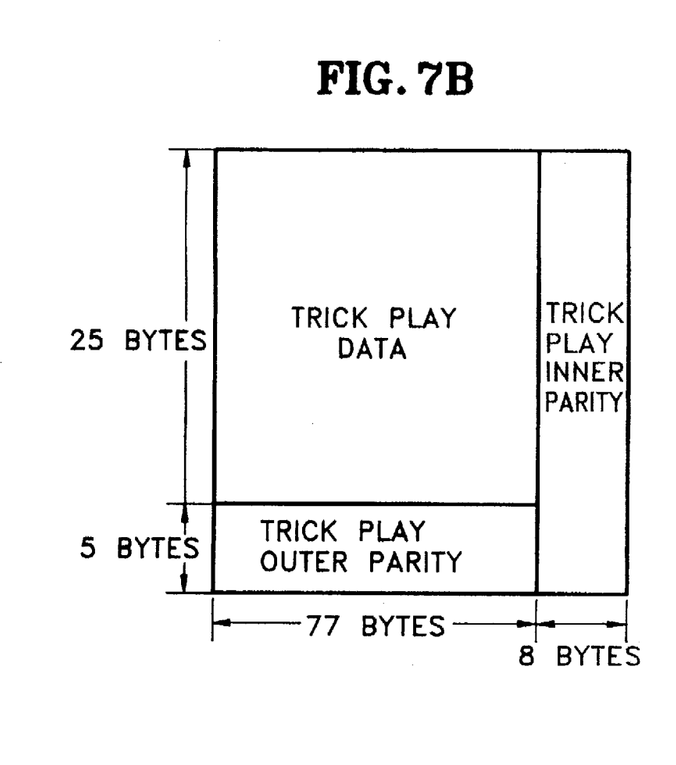

In the trick reproducing mode, the only data used are those in the trick-play data region; and the 11-byte outer parity codes associated with normal-play data are not used. The data in the trick-play data region consist of just the thirty 77-byte rows of trick-play data and their respective appendices of eight bytes of inner parity, when the trick-play data are only inner error-correction encoded as shown in FIG. 7A. Alternatively, the data used in the trick reproducing mode can consist of fewer than thirty 77-byte rows of trick-play data, with the rest of the thirty 77-byte rows being outer parity bytes generated by an outer error-correcting code for just those fewer than thirty rows of trick-play data. FIG. 7B illustrates a specific example of such an alternative, with twenty-five 77-byte rows of trick-play data and with five 77-byte rows of outer parity bytes as generated by an outer error-correcting code for just those twenty-five rows of trick-play data. In such alternatives, each of the 77-byte rows of trick-play data and each of the 77-byte rows of outer parity bytes generated by the outer error-correcting code for just trick-play data are subjected to inner error-correction coding and are provided with respective appendices of eight bytes of inner parity.

Figure 6A:
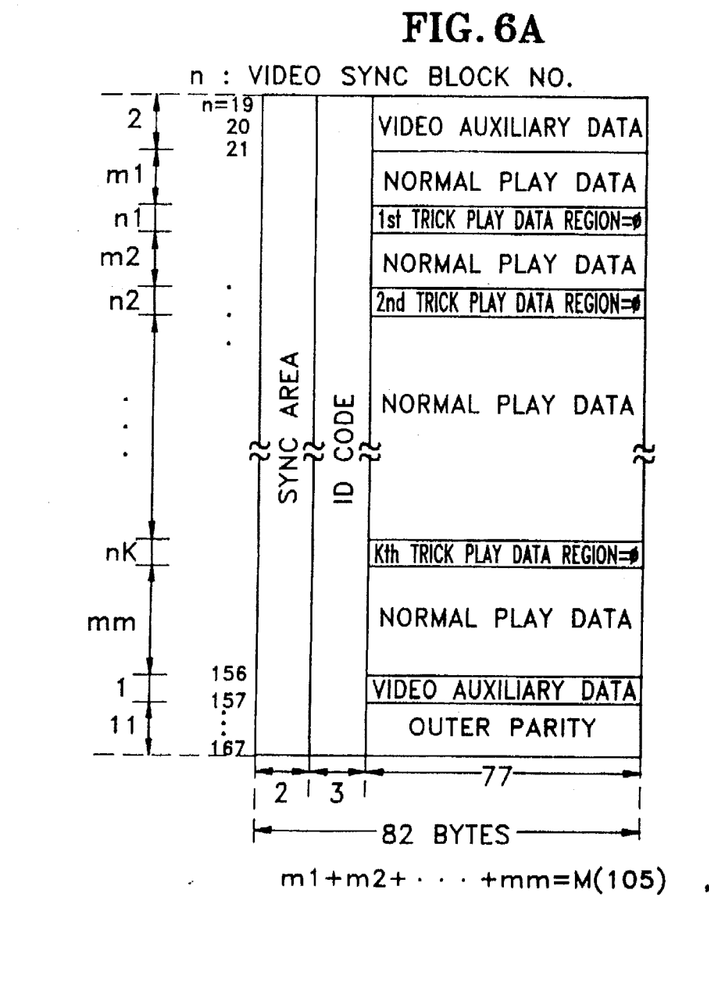
FIGS. 6A and 6B are diagrams for illustrating the outer and inner error-correction encoding operations performed in the error-correction encoding unit of FIG. 4, so as to arrange the data as shown in FIG. 3.
Figure 6B:
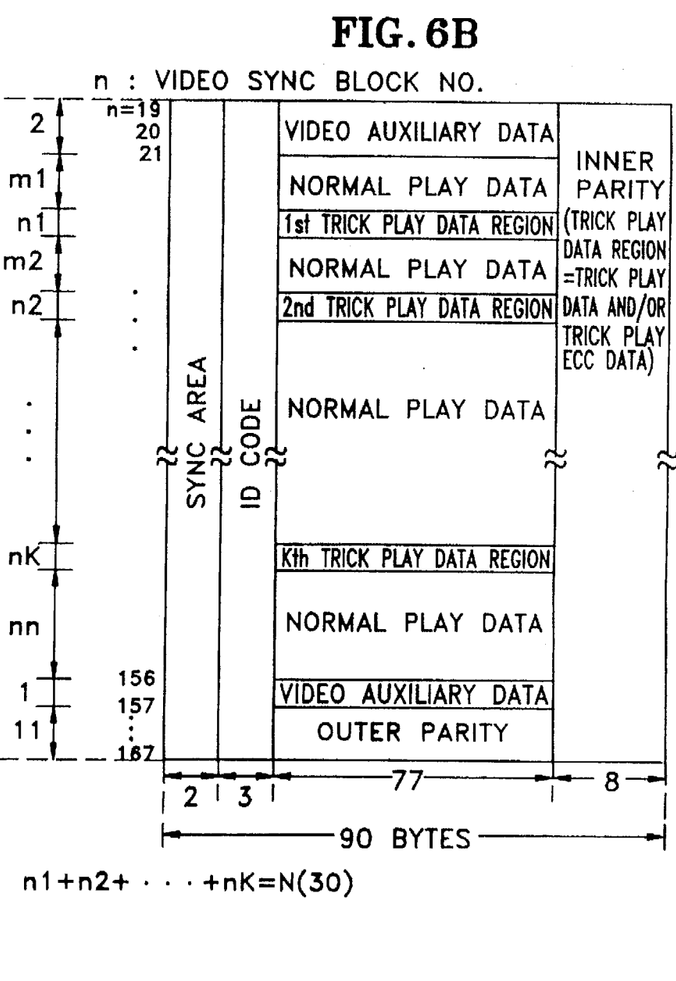

FIG. 6A illustrates a step in a method embodying an aspect of the invention used when trick-play data are positioned as shown in FIG. 3. All bytes in the $1^{st}$ through $k^{th}$ trick-play data regions are replaced by arithmetic zeroes in the input signal supplied to the outer error-correction encoder 41 for calculating the outer parity code bytes. Thereafter, the trick-play data are restored in the signal supplied to the inner error-correction encoder 42 for calculating the inner parity code bytes. The encoder 42 appends 8-byte inner parity to the 77 bytes of data in each row in a way similar to that shown in FIG. 6B. The trick-play data are not provided with outer error-correction coding; or, alternatively, are provided with their own outer error-correction coding and include rows of trick-play outer parity.

The outer error-correction encoder 41 and the inner error-correction encoder 42 usually are constructed using microprocessor (µp) and random-access-memory (RAM) components. In such case the changes in the outer error-correction encoder 41 from previous SD-VCR recording practice are accomplished merely by changing microprocessor programming.

Figure 8:
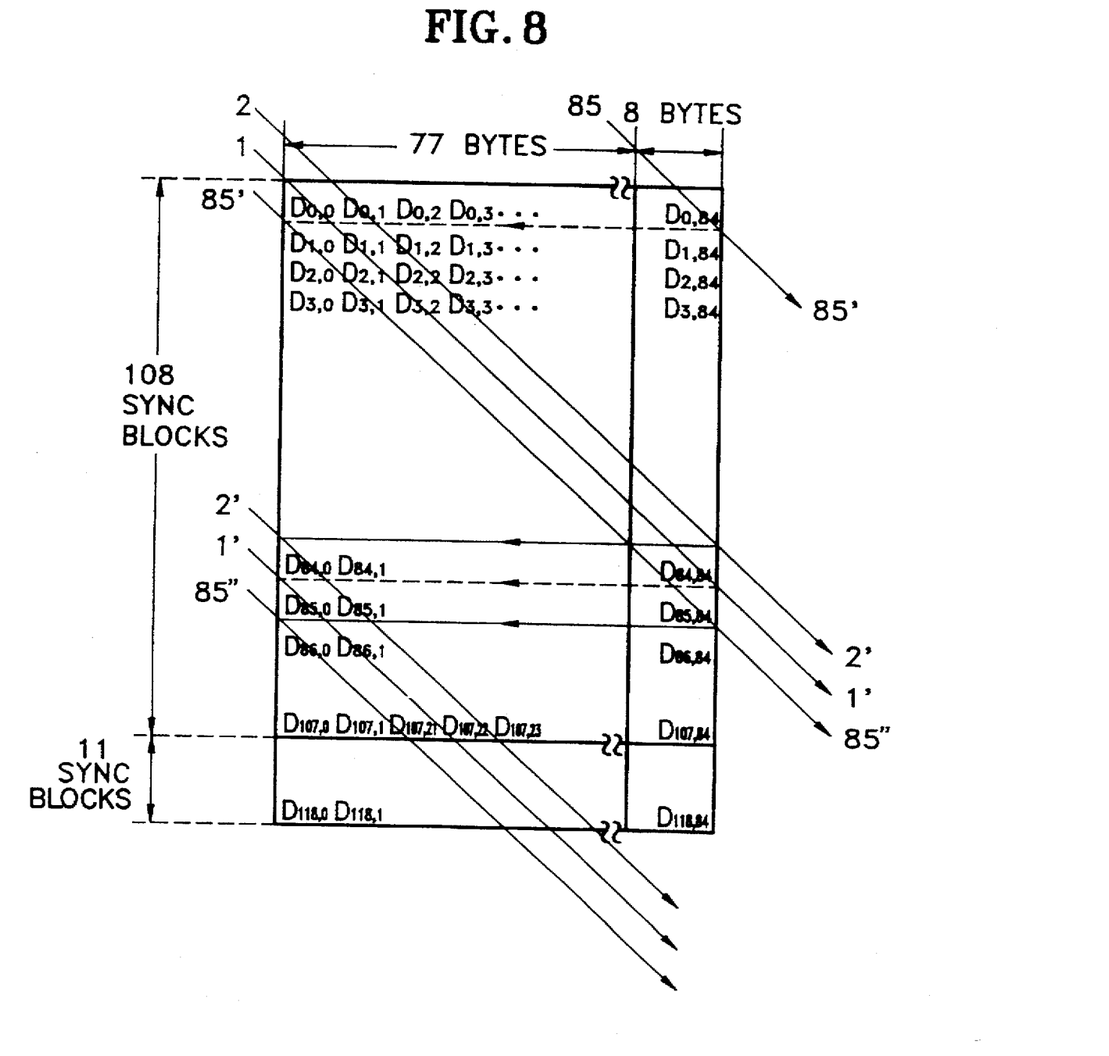
FIG. 8 is a diagram for illustrating an interleaving process performed in the ECC block rearrangement unit of FIG. 4 in a further aspect of the invention in regard to recording digital video.

An ECC block rearranger 50, which is not present in the conventional SD-VCR, interleaves the error-correction encoded data, performing an interleaving operation on the normal play data as shown in FIG. 8. The data are considered as being arranged in diagonal rows, rather than horizontal rows, for purposes of recording on a digital video tape and of reproducing from that digital video tape. These diagonal rows are defined by scanning the data arrayed in horizontal rows and vertical columns so as to select bytes that are in the next row and the next column respective to immediately preceding bytes. Scanning of these diagonal rows is such that the data arrayed in horizontal rows and vertical columns are mapped to the surface of a right circular cylinder so the zeroeth column is next after the $85^{th}$ column as well as before the first column. This procedure, which is referred to as "wrap-around" diagonal scanning, creates complete diagonal scans each consisting of 119 bytes. Error bursts occurring on the recorded track will be disposed along the diagonal rows as reproduced during playback of the digital video tape, tending to appear as single errors in the horizontal rows of the ECC block, as recovered by de-interleaving. This facilitates the correction of these errors by the inner error-correction codes used in the horizontal rows of the ECC block.

More particularly, certain inner error-correction encoded data bytes in the ECC block are selected in the sequence $D_{(0,0)}, D_{(1,1)}, D_{(2,2)}, D_{(3,3)}, \ldots, D_{(84,84)}$ for recording, scanning the ECC block along a locus 1 to perform this selection. Supposing the ECC block bytes to be stored in random-access memory addressed by row and by column using respective address counters, scanning data bytes in the ECC block along the locus 1 is accomplished by the row address counter and the column address counter each starting from a respective zero count output and counting address advance pulses applied to each of them as count input.

Certain arrays of m rows of n bytes can be completely and recurrently scanned by simply allowing the row address counter and the column address counter to count continuously; other arrays will not be completely scanned before recursion of scan begins to leave the remainder of the array unscanned. All m-byte-by-n-byte arrays can be completely scanned if, when a first of the address counters reaches the end of its cycle to return its output count to zero count; the other, second address counter is jam-loaded with a value that is provided by a diagonal row counter that counts the number of times the first address counters reaches the end of its cycle.

FIG. 8 shows the result of choosing the first and second address counters to be the row address counter and the column address counter, respectively. Since there are more rows than columns wrap-around diagonal addressing results, with the data arrayed in horizontal rows and vertical columns being mapped to the surface of a right circular cylinder so the zeroeth column is next after the $85^{th}$ column as well as before the first column. This choice is more likely during de-interleaving to place individual errors of an error burst in different rows. A wrap-around diagonal row will then have 119 bytes, like a column. This is because the row address counter is allowed to count continuously, with the column address counter being jam-loaded each time the column address counter output count rolls over to zero.

Scanning the ECC block along the locus 1 to select the data sequence $D_{(0,0)}, D_{(1,1)}, D_{(2,2)}, D_{(3,3)}, \ldots, D_{(84,84)}$ provides only 85 bytes of the first 119-byte wrap-around diagonal row. The remaining 34 bytes of the first 119-byte wrap-around diagonal row are provided by scanning the ECC block along a locus 1' to select the data sequence $D_{(85,0)}, D_{(86,1)}, \ldots, D_{(118,33)}$. A burst error occurring along the loci 1 and 1' will be dispersed during de-interleaving so that only a single byte error occurs in any of the horizontal rows of data, permitting the correction of that single byte error by the respective inner error-correction code located in that horizontal row, supposing there are not too many other byte errors in that horizontal row.

The row address counter rolls over to zero output count responsive to the next address advance pulse after that counter reaches one-hundred-eighteen output count; and the column address counter is jam-loaded to supply an output count of one, The data sequence $D_{(0,1)}, D_{(1,2)}, \ldots, D_{(83,84)}$ is selected along a locus 2. This provides only 84 bytes of the second 119-byte wrap-around diagonal row. The output count from the column address counter rolls over to zero, and output count from the row address counter advances to eighty-four. The data sequence $D_{(84,0)}, D_{(85,1)}, \ldots, D_{(118,34)}$ is then selected to provide remaining 35 bytes of the second 119-byte wrap-around diagonal row, by scanning the ECC block along a locus 2' as the column address counter and the row address counter continue their respective counting of count advance pulses. The output count from the row address counter rolls over to zero, and the column address counter is jam-loaded to provide an output count of two to begin the scanning of the next wrap-around diagonal row.

Diagonal scanning continues in the general way described above, with the scanning of the final 119-byte wrap-around diagonal row taking place as follows. The scanning of the final wrap-around diagonal row begins with scan along a locus 85 that selects the byte $D_{(0,84)}$ for recording. This selection is responsive to roll-over to zero output count of the row address counter having occurred eighty-four times since beginning the scan of the ECC block, resulting in the column address counter having been jam-loaded with an output count of eighty-four. The output count of column address counter rolls over to zero responsive to next address advance pulse, and the row address counter continues its count to generate an output count of one. The address counters then select a data sequence $D_{(1,0)}, D_{(2,1)}, \ldots, D_{(85,84)}$ scanning along a locus 85'. The output count of column address counter rolls over to zero responsive to next address advance pulse, and the row address counter continues its count to generate an output count of eighty-six. The address counters then select a data sequence $D_{(86,0)}, D_{(87,1)}, \ldots, D_{(118,32)}$ scanning along a locus 85" to complete the scanning of all bytes in the ECC block.

Defining a wrap-around diagonal row as having 119 bytes requires the ECC block rearranger 50 to re-parse the data into 85-byte segments for packing into the spaces between sync and ID code segments. Choosing the first and second address counters to be the column address counter and the row address counter, respectively, avoids the need for such re-parsing since it defines a complete diagonal row as having 85 bytes. Very long burst errors are not as effectively distributed, however, presuming the row address counter to be jam-loaded with a consecutive value each time the output count of the column address counter rolls over to zero. If one modifies the jam-loading of the row address counter so the pattern of row address counting is as close to being continuous as possible without placing short segments of a long burst error in the same horizontal row, very long burst errors can be as effectively distributed as they are in the wrap-around diagonal scanning of FIG. 8. The count of column address roll-overs to zero can be used to address a read-only memory holding the optimum jam loads for the row address counter.

Defining a complete diagonal row as having as many bytes as in a horizontal row introduces the possibility of including the sync and ID codes in the diagonal interleaving, which simplifies timing of the interleaving and de-interleaving procedures. The sync code does not change from one sync block to the next. So, with attention to details of design, diagonal scan interleaving that includes the sync and ID codes will not affect the sync codes as they appear recorded on the tape. The sync codes as directly reproduced from the tape are used by the servomechanisms that control relative movement between the tape and the heads during playback. Since protection of the sync codes from corruption by burst error can be achieved by averaging methods, diagonal-scan interleaving that includes the ID codes and the inner codes, but not the sync codes, is another design possibility.

Alternative arrangements can be used in which the assembler 30 is not positioned as shown in FIG. 4, but an assembler is used after the ECC block rearranger 50 instead.

Figure 9:
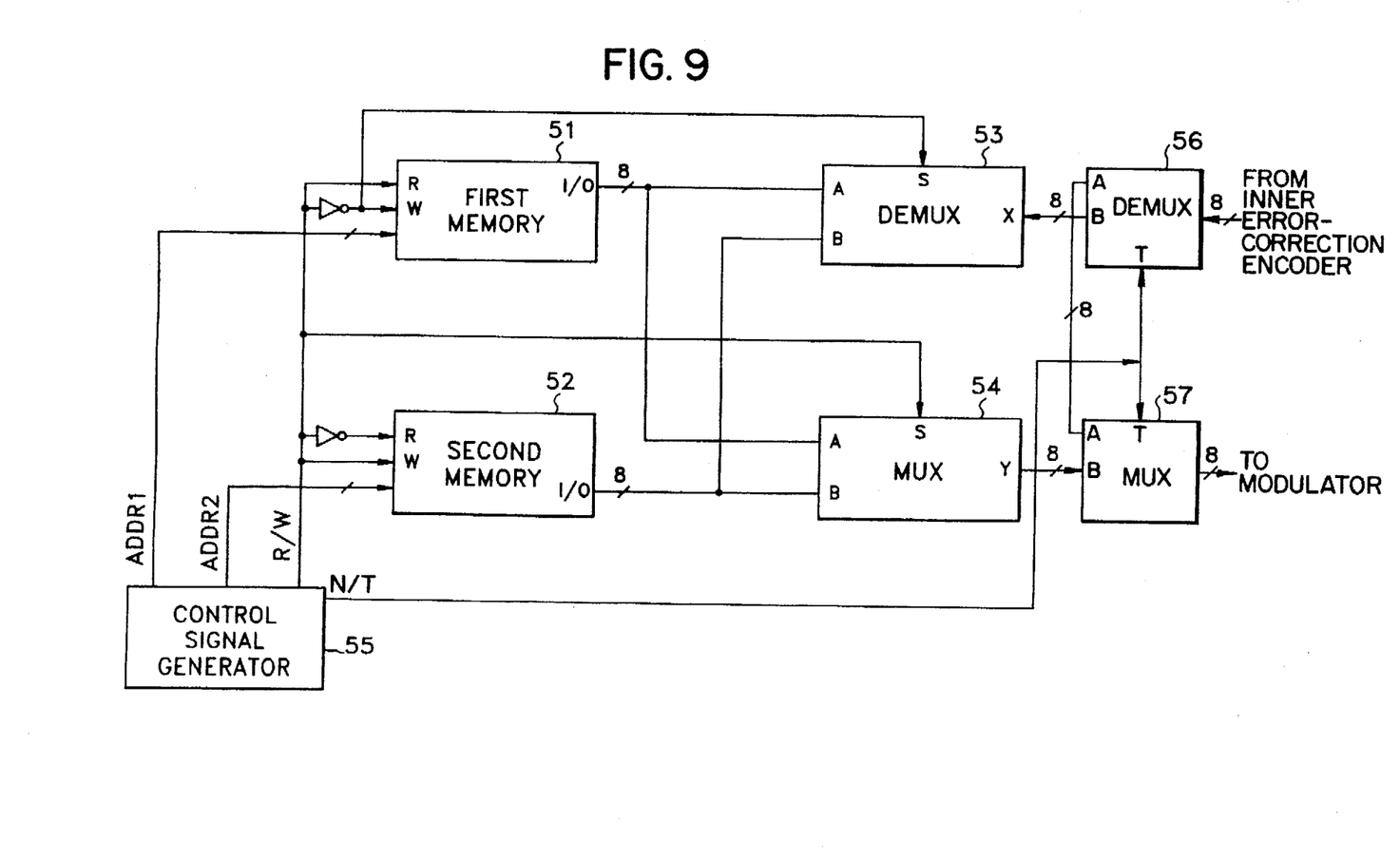
FIG. 9 is a block diagram showing the inner construction of the ECC block rearrangement unit of FIG. 4 when the FIG. 8 interleaving process is performed.

FIG. 9 is a block diagram showing one way to construct the ECC block rearranger 50 of FIG. 4. First and second memories 51 and 52 are written and read in staggered fashion, data being written into one of the memories 51 and 52 during the same time period that previous data are read from the other. A demultiplexer 56 receives the data of 108 sync blocks (105 normal reproducing sync blocks plus three video auxiliary sync blocks) supplied from the inner error-correction encoder 42 shown in FIG. 4, which data are separated from their sync and ID code segments. Rearranged data are supplied from a multiplexer 57 to be re-parsed into 85-byte segments (by means not shown) for packing into the spaces between sync and ID code segments. The signal resulting from this packing is supplied as the video component of modulating signal applied to the modulator 60 of FIG. 4, which modulator 60 supplies modulated output signal to be recorded on the tape.

A control signal generator 55 supplies a normal-play/trick-play control signal N/T that is "low" at times to indicate that the inner error-correction encoder 42 is supplying trick-play rows. This "low" normal-play/trick-play control signal N/T conditions the demultiplexer 56 to select, to its output A, the video data supplied from the inner error-correction encoder 42 of FIG. 4 and separated from their sync and ID code segments. This "low" normal-play/trick-play control signal N/T conditions the multiplexer 57 to select the data supplied to its input A from the output A of the demultiplexer 53, for application to the modulator 60 shown in FIG. 4. The trick-play data are accordingly routed through the ECC block rearranger 50 without the bytes thereof being rearranged for recording.

The control signal generator 55 supplies a normal-play/trick-play control signal N/T that is "high" at times to indicate that the inner error-correction encoder 42 is supplying video rows other than trick-play rows. When the inner error-correction encoder 42 is supplying video rows other than trick-play rows, the control signal generator 55 also supplies a first read/write address (ADDR1) for the first memory 51, a second read/write address (ADDR2) for the second memory 52, and a read/write control signal (R/W). The write address generated from control signal generator 55 is a sequential address in the order of $D_{(0,0)}$, $D_{(0,1)}$, $D_{(0,2)}$, ..., $D_{(118,84)}$. However, the read address is generated in the 1, 1', 2, 2', ..., 85, 85' and 85" directions shown in FIG. 8, that is, in the sequence of $D_{(1,1)}$, $D_{(2,2)}$, $D_{(3,3)}$, ..., $D_{(84,84)}$, $D_{(85,0)}$, $D_{(86,1)}$, ..., $D_{(118,33)}$, $D_{(0,1)}$, $D_{(1,2)}$, ..., $D_{(118,32)}$.

If the normal-play/trick-play control signal N/T is "high", indicative that the inner error-correction encoder 42 is supplying video rows other than trick-play rows, the demultiplexer 56 is conditioned to select to its output B the video data supplied from the inner error-correction encoder 42 of FIG. 4 and separated from their sync and ID code segments. The video data at the output B of the demultiplexer 56 are applied to the input of a further demultiplexer 53. The "high" normal-play/trick-play control signal N/T conditions the multiplexer 57 to select the data supplied to its input B from the output A of a multiplexer 54, for application to the modulator 60 shown in FIG. 4.

If the read/write control signal is "high", the first memory 51 is conditioned for reading, and the second memory 52 is conditioned for writing. The data stored in the first memory 51 are read to the input A of a multiplexer 54 in the interleave sequence shown in FIG. 8. The multiplexer 54 is conditioned by the read/write control signal being "high" to select the data, read to its input A from the first memory 51, to the input B of the multiplexer 57; and the multiplexer 57 is conditioned by the normal-play/trick-play control signal N/T being "high" to supply the data read to its input B to the modulator 60 of FIG. 4. The demultiplexer 53 is conditioned by the read/write control signal being "high" to select, to its output B, the video data supplied to its input from the output of the demultiplexer 56. These video data, previously supplied from the inner error-correction encoder 42 of FIG. 4 and separated from their sync and ID code segments, are written into the second memory 52.

If the read/write control signal is "low", the first memory 51 is conditioned for writing, and the second memory 52 is conditioned for reading. The data stored in the second memory 52 are read to the input B of the multiplexer 54 in the interleave sequence shown in FIG. 8. The multiplexer 54 is conditioned by the read/write control signal being "low" to select the data, read to its input B from the second memory 52, to the input B of the multiplexer 57; and the multiplexer 57 is conditioned by the normal-play/trick-play control signal N/T being "high" to supply the data read to its input B to the modulator 60 of FIG. 4. The demultiplexer 53 is conditioned by the read/write control signal being "low" to select, to its output A, the video data supplied to its input from the output of the demultiplexer 56. These video data, previously supplied from the inner error-correction encoder 42 of FIG. 4 and separated from their sync and ID code segments, are written into the first memory 51.

Figure 10:
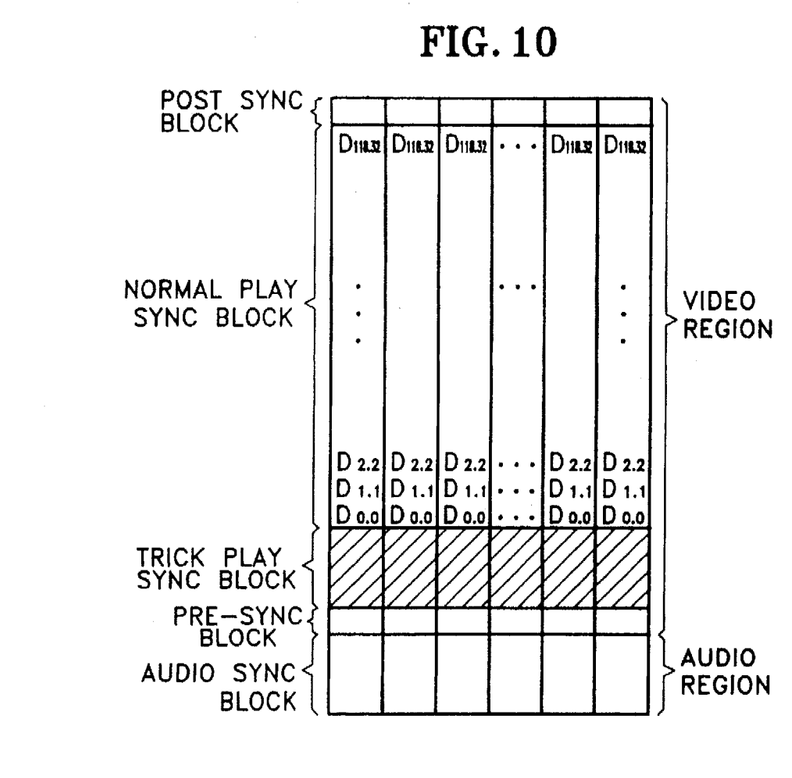
FIGS. 10, 11 and 12 are diagrams for illustrating the format of the signal supplied for recording on a digital video tape recorded according to an aspect of the invention.
Figure 11:
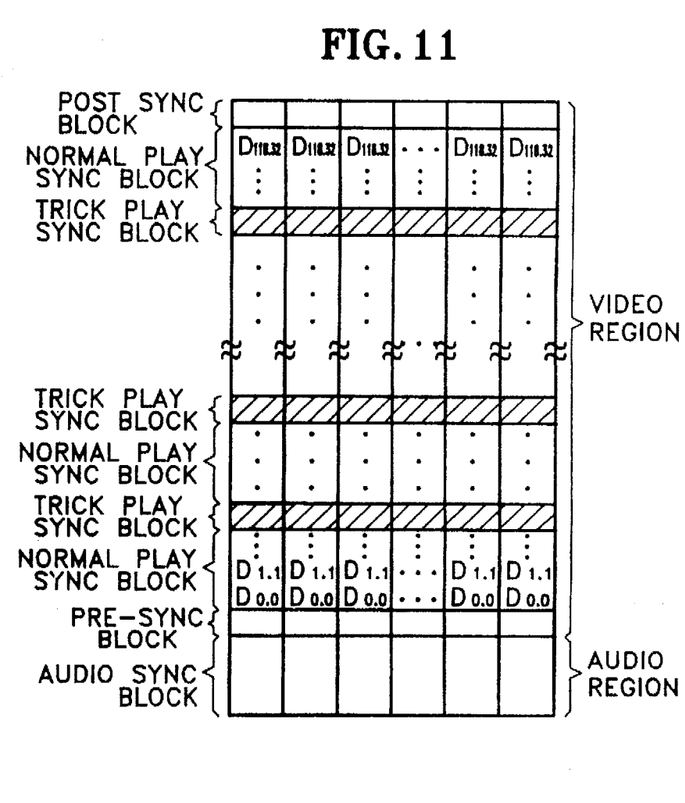
Figure 12:
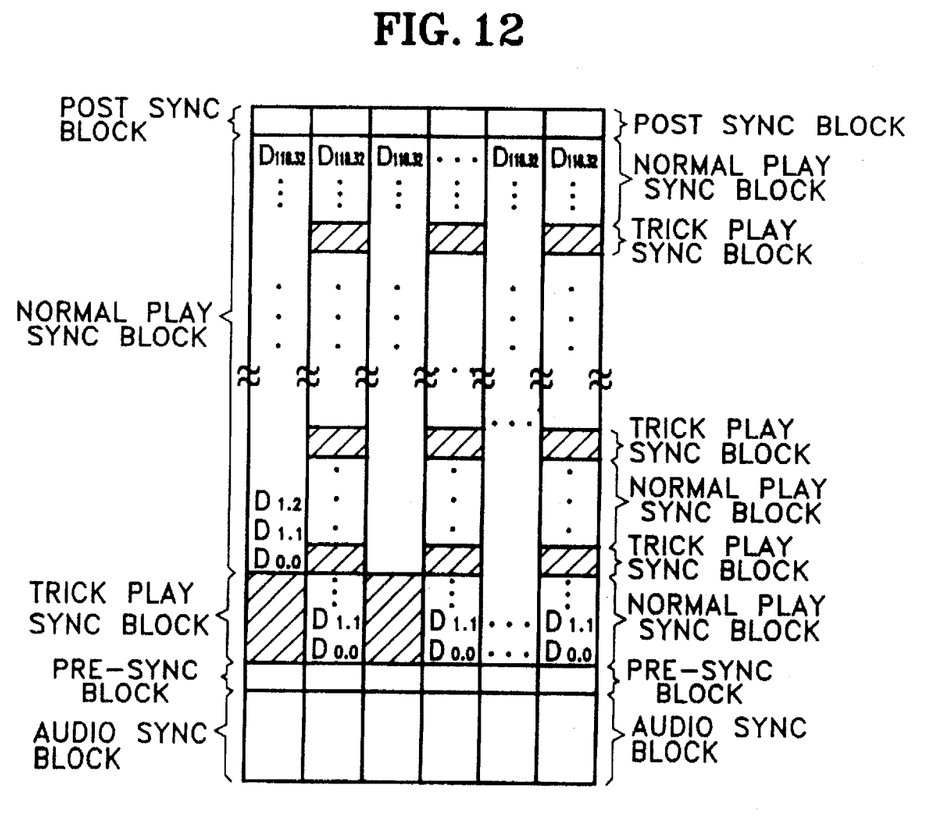

The code format of the complete modulating signal applied to the modulator 60 is as shown in FIGS. 10, 11 and 12. Each column of code is recorded on a separate helical recording track.

FIG. 10 shows the complete modulating signal format where the trick-play data recorded on a pair of tracks are repetitively recorded on as many non-overlapping pairs of adjacent tracks as correspond to the maximum multiple speed. Each track shown in FIG. 10 is composed of an audio sync block, a pre-sync block, a trick-play sync block for recording the trick-play data, a normal-play sync block for recording the interleaved data, and a post-sync block.

FIG. 11 represents the tape having a recording format where the trick-play data are arranged into scanning regions corresponding to each multiple speed. Each track shown in FIG. 11 is composed of an audio sync block, a pre-sync block, a trick-play sync block divided into a predetermined number (k) of regions, a normal-play sync block divided into m=(k+1) regions for recording the interleaved data, and a post-sync block.

FIG. 12 shows an example of alternately recording the data over two track periods according to the recording format shown in FIGS. 10 and 11. FIG. 12 is an example of how the ATV recording can provide for overcoming both the drawback of low picture quality found in the recording format shown in FIG. 10 and the drawback of high price found in the recording format shown in FIG. 11.

Thus, in the case of recording the interleaved data on the normal-play sync block according to any of the recording formats shown in FIGS. 10 to 12, even though a burst error is generated on the track, the burst error can be corrected after converting it to randomly occurring isolated errors.

Figure 13:
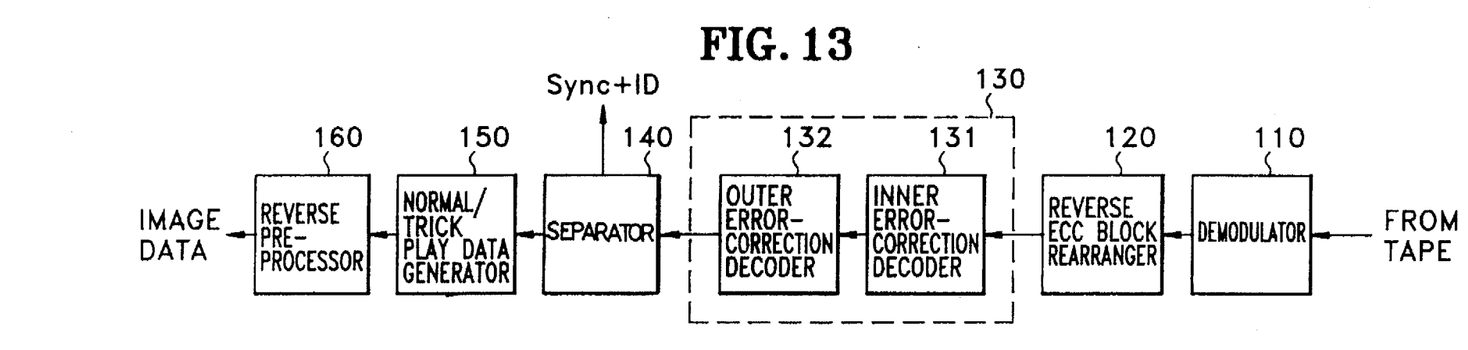
FIG. 13 is a block diagram of a digital video data reproducing apparatus for reproducing digital video data from a recording in accordance with a method that is an aspect of the invention.

FIG. 13 shows digital video data reproducing apparatus for performing the methods that are aspects of the invention. This reproducing apparatus reproduces the data from digital video tape in an operational sequence that is essentially a reversal of operational sequence employed when recording with the recording apparatus shown in FIG. 4 disposed on the same page as FIG. 13.

The data reproduced from the tape are demodulated in a demodulator 110. A reverse ECC block rearranger 120 de-interleaves the demodulated video data to recover the data sequence of the original ECC block structure. The general structure of the reverse ECC block rearranger 120 is generally similar to the ECC block rearranger 50, and the recorder/reproducer apparatus may use common apparatus for carrying out both functions. The reverse ECC block rearranger 120 differs from the ECC block rearranger 50 in that the writing rather than the reading of two memories uses wrap-around diagonal scanning of their storage locations in response to appropriate row and column addressing, and in that the reading of those two memories rather than their writing is done by scanning their storage locations horizontal row by horizontal row in response to appropriate row and column addressing. The ECC block rearranger 120 is not found in prior-art reproducer addressing. The ECC block rearranger 120 is not found in prior-art reproducer apparatus.

The de-interleaved data are error-correction decoded in an error-correction decoding unit 130. That is, an inner error-correction decoder 131 of the unit 130 corrects errors of up to four bytes per 85-byte sync block and appends an error flag to each sync block that remains incorrect. The inner error correction capacity of a two-dimensional Reed-Solomon code is a number of byes equivalent to one-half the number of bytes of inner parity. Because of error flagging signalling the positions likely to be in error, the outer error correction capacity of a two-dimensional Reed-Solomon code is a number of bytes equivalent to the number of bytes of outer parity.

The diagonal interleaving and de-interleaving procedure causes burst errors to be diagonally disposed across the rows and columns of the two-dimensional Reed-Solomon code array. The fact the burst errors cross the rows of the code array provides the inner coding with substantial long-burst-error correcting capability. This is done without reducing the long-burst-error correcting capability of the outer coding, which capability arises from the fact that the burst errors cross the columns of the code array. The diagonal interleaving is transversal (in a coding sense) to both horizontal (inner) error-correction coding and vertical (outer) error-correction coding. So both codes are provided with substantial long burst error correcting capability. Irrespective of the type of diagonal scanning, burst errors that appear in fewer scan lines than the number of errors that the inner error-correction code can correct, will be corrected by the inner error-correction coding. The eight-byte inner error-correction code can correct a burst error up to four scan lines long, presuming that single-byte errors do not have to be isolated for correction. Since burst error as long as the number of samples in four diagonal scan lines can be corrected by the inner error-correction coding without setting error flags, the capability of the outer error-correction code to correct burst error sustained for the number of samples in eleven horizontal rows is not compromised by this burst error. Another burst error as long as the number of samples in eleven diagonal scan lines can be corrected as long as it does not appear in the same horizontal rows as the first-considered burst. The length of the longest correctable single burst error is still the same as in the prior art. But the advantage of being able to correct shorter burst errors without having to rely on the outer coding is quite significant since errors occurring in magnetic recording procedures are quite likely to be short burst errors.

When performing outer error-correction decoding, an outer error-correction decoder 132 within the error-correction decoding unit 130 replaces the trick-play data with the prescribed N by 77 bytes pattern that replaced them during outer error-correction encoding. As a result, up to eleven erroneous bytes per column of 149-N normal-play bytes can be corrected by the outer error-correction decoding, rather than up to eleven erroneous bytes per column of 149 normal-play and trick-play bytes as in the prior art. That is, where there are 30 rows of trickplay data, up to eleven erroneous bytes per column of 119 normal-play bytes can be corrected by the outer error-correction decoding. Burst errors that occur within the trick-play rows do not use up any of the error-correcting capability of the outer error-correction encoding, so recurrent long burst errors in the normal-play data are more likely to be corrected by the outer error-correction encoding.

The remaining portions of the FIG. 13 reproducer apparatus are similar to what is used in the prior art. In separator 140, the sync code and identification code are separated from the error-correction decoded normal-play and trick-play data output from error-correction decoding unit 130. A normal/trickplay data generator 150 comprises a multiplexer, receives the normal-play and trick-play data from which the sync code and identification code are separated, and generates the normal-play or trick-play data according to the normal and trick reproducing modes. Then, a reverse pre-processor 160 changes the normal-play and trick-play data output from normal/trickplay data generator 150 into the transport packet structure to be supplied as reproduced ATV signal.

The correction of burst errors in the trick-play data does not require that the trick-play data be provided with their own outer error-correction coding as shown in FIG. 7B. Instead they can be subjected to diagonal-scan interleaving and de-interleaving procedures, so their inner error-correction coding is provided with capability for correcting burst errors.

The entire output signal from the inner error-correction coder can be subjected to wrap-around diagonal-scan interleaving, thereby providing diagonal scan interleaving for the normal-play rows, the trick-play rows and the rows of outer parity. The length of each wrap-around diagonal scan is lengthened from 119 bytes to 149 bytes, decreasing the likelihood that very long burst errors will cause four bytes per row or eleven bytes per column to be in error. Thus the capabilities for correcting burst errors are increased for both the inner and outer error-correction codes.

Diagonal-scan interleaving after two-dimensional Reed-Solomon encoding, to prepare data for a transmitter transmitting through a channel susceptible to burst error longer than the inner codes is generally useful. It is useful, for instance, for coding digital signals that are to be buried in NTSC television signals during trace intervals. Diagonal-scan de-interleaving before two-dimensional Reed-Solomon decoding is generally useful in receivers designed for use with such transmitters.

One skilled in the art will by acquaintance with the foregoing disclosure be enable to design a variety of variants of the preferred embodiments of the invention specifically described; and this should be borne in mind when construing the scope of the claims which follow.

What is claimed is:

1. A transmitting method of providing for error-correction of bytes of data in electric signal form that are transmitted through a transmission medium subject to sustained burst error, said method comprising the steps of:

parsing said bytes of data into a first two-dimensional data structure having bytes arrayed by row and by column;

outer coding the bytes in each of said columns of said first two-dimensional data structure with a first Reed-Solomon code to generate a second two-dimensional data structure having bytes arrayed by row and by column, said second two-dimensional data structure including a respective row of bytes corresponding to each row of bytes in said first two-dimensional data structure;

inner coding the bytes in each of said rows of said second two-dimensional data structure with a second Reed-Solomon code to generate a third two-dimensional data structure having bytes arrayed by row and by column, said third two-dimensional data structure including a respective column of bytes corresponding to each column of bytes in said second two-dimensional data structure;

interleaving the data arrayed by row and by column in said third two-dimensional data structure by diagonally scanning them to generate a one-dimensional data structure; and converting said one-dimensional data structure to a signal for transmission through said medium.

2. A transmitting method as set forth in claim 1 wherein said step of interleaving is done by diagonally scanning the data arrayed by row and by column in said third two-dimensional data structure so as to select bytes that are in the next row and the next column respective to immediately preceding bytes.

3. A receiving method of providing for error-correction of interleaved inner and outer coded data received from a transmission medium subject to sustained burst error and converted to electrical signal form to be error-corrected before application to electrical apparatus—said interleaved inner and outer coded data of a type as results from a transmission method comprising the steps of:

parsing said data into a first two-dimensional data structure having bytes arrayed by row and by column;

outer coding the bytes in each of said columns of said first two-dimensional data structure with a first Reed-Solomon code to generate a second two-dimensional data structure having bytes arrayed by row and by column, said second two-dimensional data structure including a respective row of bytes corresponding to each row of bytes in said first two-dimensional data structure;

inner coding the bytes in each of said rows of said second two-dimensional data structure with a second Reed-Solomon code to generate a third two-dimensional data structure having bytes arrayed by row and by column, said third two-dimensional data structure including a respective column of bytes corresponding to each column of bytes in said second two-dimensional data structure;

interleaving the data arrayed by row and by column in said third two-dimensional data structure by diagonally scanning them to generate a first one-dimensional data structure; and converting said first one-dimensional data structure for transmission through said medium to be received as said interleaved inner and outer coded data—said receiving method comprising the steps of:

converting said interleaved inner and outer coded data to electrical signal form to regenerate said first one-dimensional data structure as contaminated at times by byte errors, said byte errors at times being included within burst errors, some of which said burst errors are protracted burst errors extending over more bytes than can be corrected within a row by said second Reed-Solomon code;

de-interleaving the regenerated first one-dimensional data structure to regenerate said third two-dimensional data structure, with each of said protracted burst errors apportioned among successive ones of the rows of said third two-dimensional data structure;

inner decoding the rows of said third two-dimensional data structure per a decoding technique for said second Reed-Solomon code to regenerate said second two-dimensional data structure as contaminated at times by remnant ones of said byte errors;

outer decoding the columns of said second two-dimensional data structure per a decoding technique for said first Reed-Solomon code to regenerate said first two-dimensional data structure with a reduction or elimination of said remnant ones of said byte errors; and selecting bytes from said first two-dimensional data structure for application to said electrical apparatus.

4. A receiving method as set forth in claim 3 wherein said step of de-interleaving is done so as to undo interleaving done by diagonally scanning the data arrayed by row and by column in said third two-dimensional data structure so as to select bytes that are in the next row and the next column respective to immediately preceding bytes.

* * * * *